United States Patent [19]
Iida et al.

[11] Patent Number: 5,577,111
[45] Date of Patent: Nov. 19, 1996

[54] CAMP-ON COMMUNICATION MANAGING METHOD AND APPARATUS

[75] Inventors: Ichiro Iida, Kawasaki; Fumiharu Etoh, Fukuoka; Soichi Kuwahara; Takashi Nishigaya, both of Kawasaki, all of Japan

[73] Assignee: Fujitsu Limited, Kanagawa, Japan

[21] Appl. No.: 593,540

[22] Filed: Jan. 29, 1996

Related U.S. Application Data

[63] Continuation of Ser. No. 294,261, Aug. 23, 1994, abandoned.

[30] Foreign Application Priority Data

Nov. 19, 1993 [JP] Japan ..................... 5-290449

[51] Int. Cl.$^6$ ................. H04M 3/48; H04M 1/64
[52] U.S. Cl. ................. 379/209; 379/201; 379/280
[58] Field of Search ................. 379/209, 210, 379/211, 212, 213, 214, 207, 201, 280

[56] References Cited

U.S. PATENT DOCUMENTS

| | | | |
|---|---|---|---|
| 3,956,595 | 5/1976 | Sobanski | 379/209 |
| 4,313,035 | 1/1982 | Jordan et al. | 379/207 |
| 4,809,321 | 2/1989 | Morganstein et al. | 379/211 |
| 4,991,203 | 2/1991 | Kakizawa | 379/209 |
| 5,155,761 | 10/1992 | Hammond | 379/214 |
| 5,185,782 | 2/1993 | Srinivasan | 379/214 |
| 5,268,957 | 12/1993 | Albrecht | 379/209 |
| 5,311,574 | 5/1994 | Livanos | 379/214 |

FOREIGN PATENT DOCUMENTS

| | | | |
|---|---|---|---|
| 4-113366 | 1/1992 | Germany | H04M 3/48 |
| 2-811078 | 9/1979 | Japan | H04M 3/54 |
| 63-136754 | 6/1988 | Japan | H04M 3/48 |
| 1-314461 | 12/1989 | Japan | H04M 3/48 |
| 61-52748 | 5/1994 | Japan | H04M 3/48 |
| 2263845 | 8/1993 | United Kingdom | H04M 3/42 |

OTHER PUBLICATIONS

Fujioka, M., et al., "Global Networking Model for Enhanced Services Represented by UPT", ICICE Transactions, Nov. 1991, No. 11, vol. E74, pp. 3705–3718.

*Primary Examiner*—Krista M. Zele
*Assistant Examiner*—Scott Wolinsky

[57] ABSTRACT

In an exchange system which performs a communication based on personal identification information for identifying respective subscribers, the invention has an object of providing a system which can flexibly accommodate a change of the communication terminal of actual use by a movement, for instance, of a calling-side subscriber or a call-receiving-side subscriber. A camp-on communication managing apparatus of the invention has a personal position registration table in which terminal identification information for identifying a communication terminal registered to a subscriber for each personal identification information for identifying the subscriber is registered, and manages communication terminals used by respective subscribers. Thus, a camp-on communication can be established even where a camp-on-registered subscriber changes his communication terminal of actual use.

37 Claims, 11 Drawing Sheets

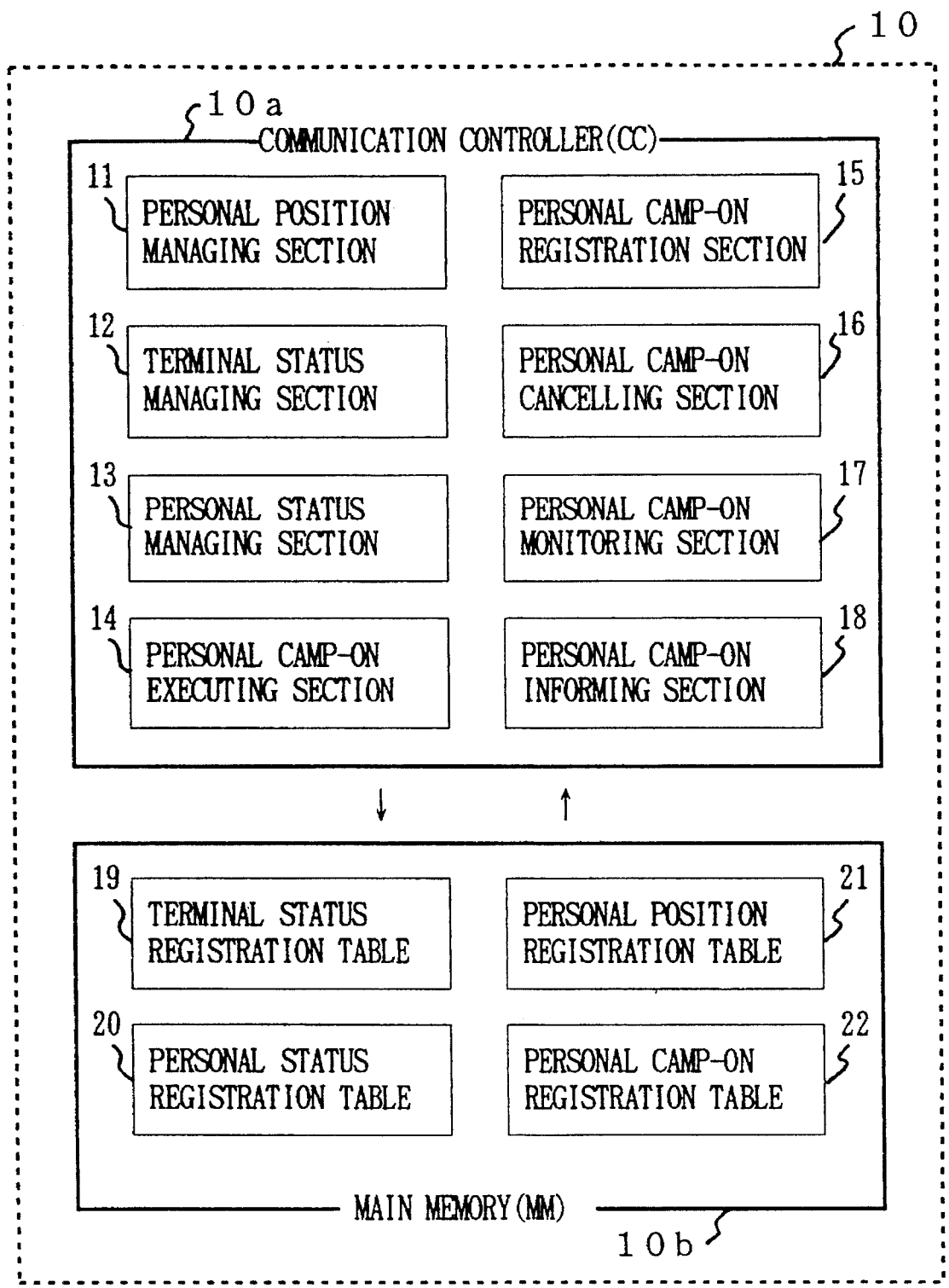
F I G. 3

| TERMINAL NUMBER | STATUS IDENTIFICATION FLAG |
|---|---|
| 2020 | 01 |
| 2021 | 00 |
| 2022 | 02 |
| ⋮ | ⋮ |

STATUS IDENTIFICATION FLAG
00 : FREE
01 : BUSY
02 : RECEPTION REJECTION

FIG. 4

| PERSONAL ID | STATUS IDENTIFICATION FLAG |
|---|---|
| 7001 | 00 |
| 7002 | 01 |
| 7003 | 02 |
| ⋮ | ⋮ |

STATUS IDENTIFICATION FLAG
00 : FREE
01 : BUSY
02 : RECEPTION REJECTION

FIG. 5

| PERSONAL ID | SUBSCRIBER-ACCOMPANIED TERMINAL NUMBER | CAMP-ON REGISTRATION FLAG |
|---|---|---|
| 7001 | 2020 | 00 |
| 7002 | 2022 | 01 |
| 7003 | 2021 | n |
| ⋮ | ⋮ | |

CAMP-ON REGISTRATION FLAG
00 : REGISTERED
01 : NOT REGISTERED
n : n REGISTERED

| PERSONAL CAMP-ON REGISTRATION NUMBER | CALLING-SIDE PERSONAL ID | CALLING-SIDE TERMINAL NO. | CALL-RECEIVING-SIDE PERSONAL ID | CALL-RECEIVING-SIDE TERMINAL NO. | CAMP-ON MONITORING TIME |
|---|---|---|---|---|---|
| 0001 | 7002 | 2022 | 7010 | 2010 | 0240 |
| 0002 | 7003 | 2021 | 7013 | 2011 | 0030 |
| 0003 | 7001 | 2023 | 7012 | 2013 | 0300 |
| .. | .. | .. | .. | .. | .. |

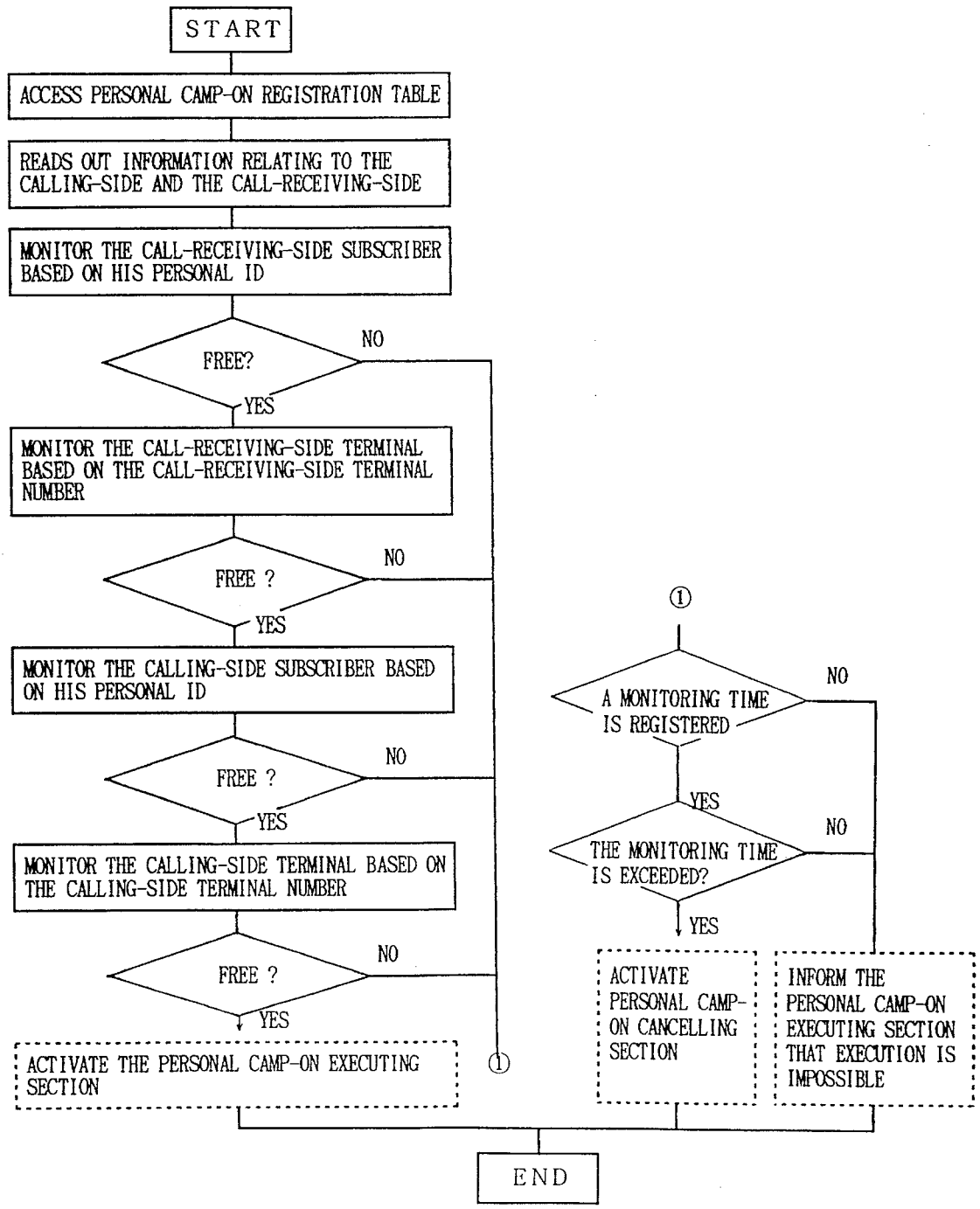
F I G. 1 2

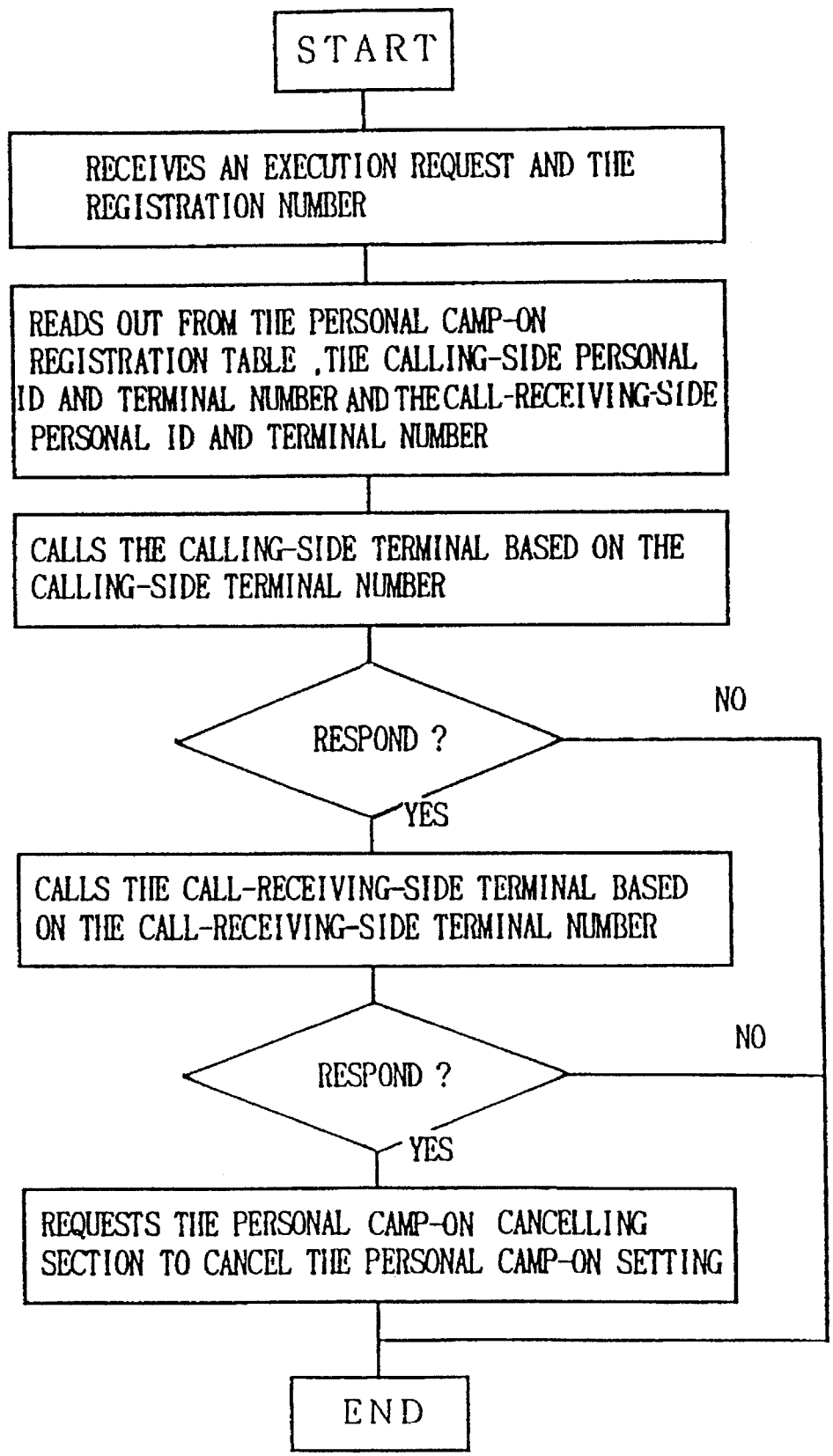
F I G. 1 3

CAMP-ON COMMUNICATION MANAGING METHOD AND APPARATUS

This is a continuation of application Ser. No. 08/294,261, filed Aug. 23, 1994 now abandoned.

BACKGROUND OF THE INVENTION

1. Field of the Invention

The present invention relates to a method and apparatus for managing a camp-on operation between subscribers in an exchange system in which a communication is performed based on personal identification information for identifying individual subscribers.

2. Prior Art

Recent exchange systems have various functions for improving the efficiency of information exchange processing. Camp-on is an example of such functions.

The camp-on is a function in which when a communication terminal A calls a communication terminal B but the latter is busy, the call from the communication terminal A is temporarily disconnected and the communication terminals A and B are called after the communication terminal B becomes free.

More specifically, when the communication terminal A calls the communication terminal B but the latter is busy, an exchange system registers terminal numbers of the communication terminals A and B. Then, the exchange system temporarily disconnects the call from the communication terminal A, and monitors the communication of the communication terminal B. Upon detection of the communication terminal B becoming free, the communication system calls the communication terminals A and B based on their terminal numbers.

The function of camp-on makes it unnecessary for the communication terminal A to perform a cumbersome task of calling plural times the communication terminal B until the end of its communication, and allows a communication to be established between the communication terminals A and B immediately after the communication terminal B becomes free.

In the above function of camp-on, which is based on the terminal numbers of the respective communication terminals, at a time point when, for instance, a subscriber on a call-receiving side changes his communication terminal of actual use by transfer, call park, etc. with his communication maintained while camp-on registration is effective, it is detected that a camp-on-registered communication terminal has become free and, therefore, that terminal not being accompanied by the subscriber is called as a camp-on operation. Also, when a subscriber on a calling side leaves his communication terminal of actual use while camp-on registration is effective, he needs to cancel the camp-on setting, which is a cumbersome task. If he fails to cancel the setting, that communication terminal is called as a camp-on operation as soon as a communication terminal on a call-receiving side becomes free, which is inefficient.

SUMMARY OF THE INVENTION

An object of the present invention is to provide a technique for allowing a communication to be established between a calling-side subscriber and a call-receiving-side subscriber even where the call-receiving-side subscriber changes his communication terminal of actual use while camp-on registration is effective.

To this end, according to the invention, not only a terminal number for identifying a communication terminal but also personal identification information for identifying a subscriber is registered when a camp-on operation is registered. More specifically, according to the invention, an exchange or a medium connected to the exchange is equipped with a personal camp-on registration table, a personal position registration table and a personal status registration table. The personal camp-on registration table is registered, for each personal identification information for identifying a calling-side subscriber who requests a camp-on operation, with terminal identification information for identifying a communication terminal used by the calling-side subscriber, personal identification information of a call-receiving-side subscriber, and terminal identification information of a communication terminal used by the call-receiving-side subscriber. The personal position registration table is registered with terminal identification information of a communication terminal used by each subscriber for personal identification information of each subscriber.

The personal status registration table is registered, for personal identification information of each subscriber, with status identification information indicating whether the subscriber is in a communication-possible state or a communication-impossible state.

In the following, a camp-on communication managing method and a camp-on communication managing apparatus according to the invention will be briefly described.

1. Camp-on Communication Managing Method

The camp-on communication managing method of the invention is constituted of the following steps:

(1) Personal position managing step (2) Personal camp-on managing step (3) Personal status managing step (4) Calling step The operation performed in each step will be described below.

The personal position managing step of item (1) includes operations of referring, when personal identification information of a calling-side subscriber and personal identification information of a call-receiving-side subscriber are received from the calling-side subscriber who has found that the call-receiving-side subscriber is busy, for instance, to the personal position registration table based on the above pieces of personal identification information, and detecting terminal identification information of a communication terminal used by the calling-side subscriber and terminal identification information of a communication terminal used by the call-receiving-side subscriber.

The personal camp-on managing step of item (2) includes an operation of registering the personal identification information of the calling-side subscriber and the personal identification information of the call-receiving-side subscriber and the calling-side terminal identification information which has been detected in the personal position managing step and the call-receiving-side terminal identification information which has been detected in the personal position managing step, in the personal camp-on registration table.

The personal status managing step of item (3) includes operations of monitoring a communication status of each subscriber, and updating a content of the personal status registration table when there occurs a status transition from a communication-possible state to a communication-impossible state or vice versa.

The calling step of item (4) includes an operation of monitoring a communication status of the call-receivingside subscriber registered in the personal camp-on registration table by referring to the personal status registration table. The calling step further includes operations of reading out, when detecting that the call-receiving-side subscriber has made a status transition to a communication-possible state, the call-receiving-side terminal identification information and the calling-side terminal identification information from the personal camp-on registration table, and calling the calling-side subscriber and the call- receiving-side subscriber.

Further, the personal position managing step of item (1) includes operations of receiving, when an arbitrary subscriber has changed his communication terminal of actual use, personal identification information of the subscriber from a new communication terminal, and updating a content of the personal position registration table.

When the content of the personal position registration table has been updated, the personal camp-on managing step of item (2) includes an operation of searching the personal camp-on registration table based on the personal identification information, and judging whether the subscriber is camp-on-registered. The personal camp-on managing step includes updating, if the subscriber is camp-on-registered, terminal identification information of the subscriber registered in the personal camp-on registration table to the new terminal identification information.

As described above, according to the camp-on managing method of the invention, a camp-on communication can be established even where a camp-on-registered subscriber changes his communication terminal of actual use by transfer etc.

2. Camp-on Communication Managing Apparatus

The camp-on communication managing apparatus according to the invention is constituted of a personal position managing means, a personal camp-on managing means, a personal status managing means and a calling means.

When receiving personal identification information of a calling-side subscriber and personal identification information of a call-receiving-side subscriber from the calling-side subscriber who has found that the call-receiving-side subscriber is busy, for instance, the personal position managing means searches the personal position registration table based on the above-pieces of personal identification information. Then, the personal position managing means detects terminal identification information of a communication terminal used by the calling-side subscriber and terminal identification information of a communication terminal used by the call-receiving-side subscriber.

Then, the personal camp-on managing means registers the personal identification information and the terminal identification information detected by the personal position managing means in the personal camp-on registration table.

The personal status managing means monitors a communication status of each subscriber, and updates a content of the personal status registration table.

The calling means monitors the personal status registration table based on personal identification information of a subscriber registered in the personal camp-on registration table. When the communication status of the call-receiving-side subscriber is updated to a communication-possible state in the personal status registration table, the calling means searches the personal camp-on registration table based on the personal identification information of the call-receiving-side subscriber. Further, the calling means reads out the terminal identification information of the calling-side subscriber and the terminal identification information of the call-receiving-side subscriber, and calls the calling-side subscriber and the call-receiving-side subscriber based on those pieces of terminal identification information. Thus, a communication can be established between the calling-side subscriber and the call-receiving-side subscriber.

Further, when an arbitrary subscriber has changed his communication terminal of actual use and the personal position managing means receives his personal identification information from a new communication terminal, the personal position managing means searches the personal position registration table based on the personal identification information, and updates terminal identification information of the subscriber to new terminal identification information. With this operation, the personal camp-on managing means searches the personal camp-on registration table based on the personal identification information of the subscriber, and Judges whether the subscriber is camp-on-registered. If the subscriber is camp-on-registered, the personal camp-on managing means updates a content of the personal camp-on registration table.

With the above constitution, a camp-on communication can be established even where a camp-on-registered subscriber changes his communication terminal of actual use by transfer etc.

BRIEF DESCRIPTION OF THE DRAWINGS

FIG. 3 is a functional block diagram showing a configuration of a camp-on communication managing server in the second embodiment;

FIG. 4 is a specific example of a terminal status registration table;

FIG. 5 is a specific example of a personal status registration table;

FIG. 6 is a specific example of a personal position registration table;

FIG. 7 is a specific example of a personal camp-on registration table;

FIG. 12 is a flowchart showing an operation of a personal camp-on monitoring section.

FIG. 13 is a flow chart showing an operation of a personal camp-on cancelling section.

DESCRIPTION OF THE PREFERRED EMBODIMENTS

EMBODIMENT 1

Figure 1:
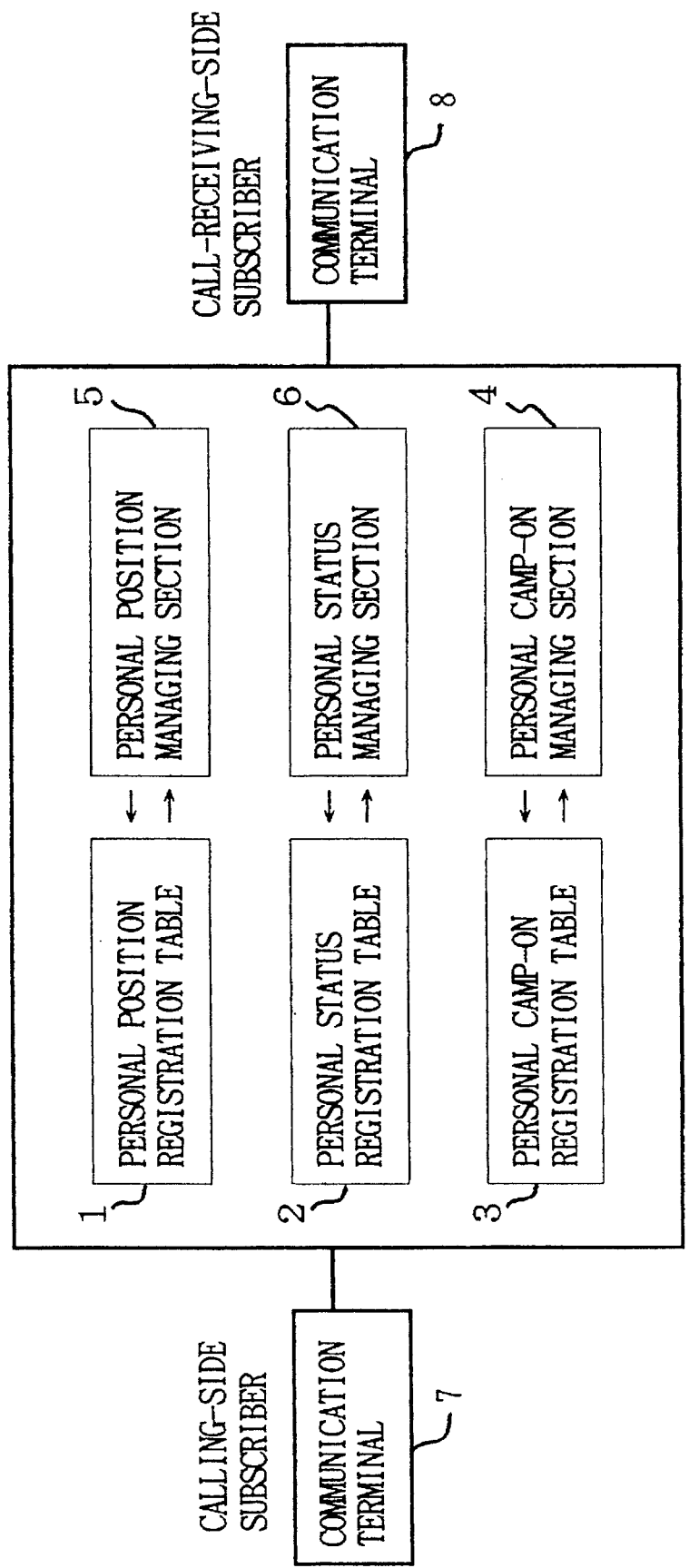
FIG. 1 is a block diagram showing a configuration of a camp-on communication managing apparatus according to a first embodiment.

A first embodiment of the invention will be described with reference to FIG. 1.

A camp-on communication managing apparatus according to this embodiment has, in an exchange, a personal position registration table 1, a personal status registration table 2, a personal camp-on registration table 3, a personal position managing section 5, a personal status managing section 6 and a personal camp-on managing section 4.

A communication terminal 7 used by a calling-side subscriber and a communication terminal 8 used by a call-receiving side subscriber are connected to the exchange.

The personal position registration table 1 is registered with terminal identification information for identifying a communication terminal being used by each subscriber for each personal identification information for identifying the subscriber.

The personal status registration table 2 is registered with information for identifying a communication status for the personal identification information of each subscriber.

The personal camp-on registration table 3 is registered with the personal identification information of the calling-side subscriber who requests a camp-on communication, the terminal identification information of the communication terminal used by the calling-side subscriber, the personal identification information of the call-receiving-side subscriber who is to receive a communication from the calling-side subscriber, and the terminal identification information of the communication terminal used by the call-receiving-side subscriber.

The personal position managing section 5 has a function of searching the personal position registration table 1 to detect the terminal identification information of the calling-side subscriber and that of the call-receiving-side subscriber based on the personal identification information of the calling-side subscriber and that of the call-receiving-side subscriber when receiving those pieces of information from the calling-side subscriber who requests a camp-on communication.

The personal position managing section 5 further has a function of updating the contents of the personal position registration table 1 when a subscriber changes his communication terminal of actual use. More specifically, when receiving the personal identification information of a subscriber from new his communication terminal of actual use, the personal position managing section 5 determines the terminal identification information of that communication terminal. The personal position managing section 5 searches the personal position registration table 1 based on the personal identification information, and rewrites the terminal identification information of the subscriber to the new one.

The personal status managing section 6 has a function of monitoring the communication status of each subscriber, and updates the contents of the personal status registration table 2. More specifically, monitoring the communication status of each subscriber, the personal status managing means 6 updates the contents of the personal status registration table 2 based on the terminal identification information of a communication terminal registered to a subscriber in the occurrence of a status transition from a state in which the subscriber can communicate to a state in which he cannot, or vice versa.

The camp-on managing section 4 has functions of a personal camp-on managing means and a calling means according to the invention. More specifically, the camp-on managing section 4 registers, in the personal camp-on registration table 3, the personal identification information of both of a calling-side subscriber who requests a camp-on communication and a call-receiving-side subscriber, and the terminal identification information on both of the calling side and the call-receiving side detected by the personal position managing section 5.

Further, the personal camp-on managing section 4 monitors the personal status registration table 2 based on the personal identification information of the call-receiving-side subscriber. Upon detection of a status transition of the call-receiving-side subscriber to a communication-possible state, the camp-on managing section 4 accesses the personal camp-on registration table 3 to read out the terminal identification information of the communication terminal 7 accompanied by the calling-side subscriber and that of 'the communication terminal 8 accompanied by the call-receiving-side subscriber. Then, the personal camp-on managing section 4 calls the calling-side subscriber and the call-receiving-side subscriber based on their terminal identification information to establish a camp-on communication.

In the occurrence of an alteration in the communication terminal 7 or 8 accompanied by an arbitrary subscriber, when receiving the personal identification information of a subscriber from the altered communication terminal 7 or 8, the personal position managing section 5 updates the contents of the personal position registration table 1 based on the received personal identification information. Further, the personal position managing section 5 informs the personal camp-on managing section 4 of the updated terminal identification information together with the personal identification information of the subscriber concerned.

When receiving the personal identification information and the new terminal identification information from the personal position managing section 5, the personal camp-on managing section 4 searches the personal camp-on registration table 3 based on the personal identification information, and judged whether the subscriber is registered in the personal camp-on registration table 3. If the judgment is affirmative, the personal camp-on managing section 4 rewrites the terminal identification information of the subscriber to the new one.

In the following, the operation of the camp-on communication managing apparatus according to the first embodiment will be described.

When a calling-side subscriber who requests a camp-on communication finds that a call-receiving-side subscriber is busy, he sends his own personal identification information and the call-receiving-side subscriber's personal identification information to the camp-on communication managing apparatus.

The personal position managing section 5 of the camp-on communication managing apparatus searches the personal position registration table 1 based on the personal identification information on both of the calling side and the call-receiving side, and detects their terminal identification information in the personal position registration table 1. Then, the personal position managing section 5 informs the personal camp-on managing section 4 of the calling-side subscriber's personal identification information and his terminal identification information and the call-receiving-side subscriber's identification information and his terminal identification information.

Upon reception of the calling-side subscriber's personal identification information and his terminal identification information and the call-receiving-side subscriber's identification information and his terminal identification information from the personal position managing section 5, the personal camp-on managing section 4 registers those pieces of information in the personal camp-on registration table 3.

On the other hand, the personal camp-on managing section 4 monitors the communication statuses of the camp-on-registered subscribers while referring to the personal status registration table 2. When finding, in monitoring the communication status of each subscriber, a communication terminal which has made a status transition from a communication-possible state to a communication-impossible state or vice versa, the personal status managing section 6 detects the terminal identification information of that communication terminal, and updates the contents of the personal status registration table 2 based on the terminal identification information. When the camp-on-registered call-receiving-side subscriber has made a status transition to a communication-possible state, the personal camp-on managing section 4 searches the personal camp-on registration table 3 base on the terminal identification information of the call-receiving-side terminal identification information, and reads out the terminal identification information of both of the calling-side subscriber and the call-receiving-side subscriber. The personal camp-on managing section 4 calls the calling-side subscriber and the call-receiving-side subscriber based on their terminal identification information to establish a camp-on communication.

When a certain subscriber has changed his communication terminal of actual use and the personal position managing section 5 receives the personal identification information from the new communication terminal, the personal position managing section 5 searches the personal position registration table 1 based on the received personal identification information, and detects the terminal identification information of the communication terminal used by the subscriber in the personal position registration table 1. At this time, the personal camp-on managing section 4 searches the personal camp-on registration table 3 based on the personal identification information of the subscriber who has changed his communication terminal, and judges whether the subscriber is registered. If the judgment is affirmative, the personal camp-on managing section 4 rewrites the terminal identification information of the subscriber concerned in the personal camp-on registration table 3.

According to this embodiment, a camp-on communication can be established even where a camp-on-registered subscriber changes his communication terminal of actual use.

EMBODIMENT 2

A second embodiment of the invention will be hereinafter described with reference to the accompanying drawings.

Figure 2:
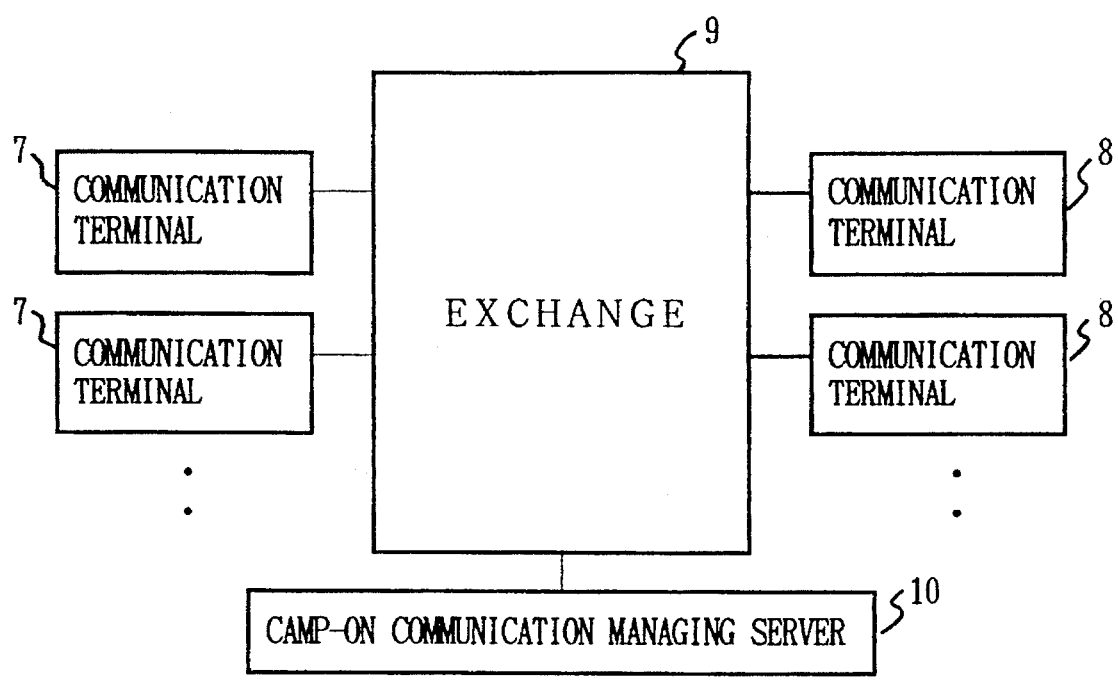
FIG. 2 is a block diagram showing a general configuration of an exchange system according to a second embodiment.

FIG. 2 is a block diagram showing a general configuration of an exchange system to which the present camp-on communication managing system is applied.

In the exchange system of this embodiment, not only a plurality of communication terminals 7 and 8 but also a camp-on communication managing server 10 for managing camp-on communications within this communication network is connected to an exchange 9 which enables operation of personal communications.

The camp-on communication managing server 10 consists of a communication controller (CC) 10a and a main memory (MM) 10b, whose functional configurations will be described with reference to FIG. 3.

The main memory (MM) 10b has a terminal status registration table 19, a personal status registration table 20, a personal position registration table 21 and a personal camp-on registration table 22.

The terminal status registration table 19 is registered with information indicating whether each communication terminal is free (i.e., in a communication-possible state), busy, or in a reception refusing state. More specifically, a status identification flag which indicates whether each communication terminal is free, busy or in a reception rejecting state is registered for a terminal number of each communication terminal (see FIG. 4).

The personal status registration table 20 is registered with information indicating whether each subscriber is free, busy, or in a reception rejecting state. More specifically, a status identification flag which indicates whether each subscriber is free, busy or in a reception rejecting state is registered for a personal ID assigned to each subscriber (see FIG. 5).

The personal position registration table 21 is registered with a current position of each subscriber, that is, registered with the terminal number of a communication terminal accompanied by a subscriber for the personal ID of each subscriber. A camp-on registration flag is to identify whether the corresponding subscriber belongs to a camp-on setting (calling-side subscriber or call-receiving-side subscriber). For example, "01" is registered for a subscriber who belongs to a camp-on setting and "00" is registered for a subscriber who does not belong to a camp-on setting. Where a certain subscriber is involved in a plurality of camp-on settings, the number "n" of camp-on settings is registered.

The personal camp-on registration table 22 is registered, for each personal camp-on registration number, with data relating to a calling-side subscriber who requests a camp-on communication and data relating to a call-receiving-side subscriber as a communication destination. More specifically, there are registered the personal ID of a calling-side subscriber, the terminal number of a communication terminal accompanied by the calling-side subscriber, the personal ID of a call-receiving-side subscriber, the terminal number of a communication terminal accompanied by the call-receiving-side subscriber, and a monitoring time (see FIG. 7). The monitoring time will be described later.

On the other hand, the communication controller (CC) 10a has a personal position managing section 11, a terminal status managing section 12, a personal status managing section 13, a personal camp-on executing section 14, a personal camp-on registering section 15, a personal camp-on canceling section 16, a personal camp-on monitoring section 17, and a personal camp-on informing section 18.

The personal position managing section 11 determines the current position of each subscriber, and registers it in the above-mentioned personal position registration table 21. More specifically, the personal position managing section 11 determines the terminal number of a communication terminal accompanied by each subscriber, and registers that terminal number in the personal position registration table 21.

The terminal status managing section 12 monitors each communication terminal, judges whether each communication terminal is free, busy or in a reception rejecting state, and registers a status identification flag indicating one of those statuses in the terminal status registration table 19.

The personal status managing section 13 judges, based on the above-mentioned personal position registration table 21 and terminal status registration table 19, whether a communication terminal accompanied by each subscriber is free, busy or in a reception rejecting state. Further, the personal status managing section 13 registers a status identification flag indicating one of those statuses in the personal status registration table 20.

When receiving a camp-on setting request from a calling-side subscriber who has found that a call-receiving-side subscriber is busy or in a reception rejecting state, the personal camp-on registering section 15 accesses the personal position registration table 21 based on the personal ID of the calling-side subscriber and the personal ID of the call-receiving-side subscriber. By accessing the personal position registration table 21, the personal camp-on registering section 15 reads out the terminal number of a communication terminal accompanied by the calling-side subscriber and the terminal number of a communication terminal accompanied by the call-receiving-side subscriber and, at the same time, increases by 1 the number of registrations or sets camp-on registration flag. Further, the personal camp-on registering section 15 registers the personal ID of the calling-side subscriber and the personal ID of the call-receiving-side subscriber and the terminal number of the calling-side subscriber and the terminal number of the call-receiving-side subscriber in the personal camp-on registration table 22.

In the above operation, when receiving, together with the camp-on setting request, a particular time from the calling-side subscriber, the personal camp-on registering section 15 registers the particular time in the personal camp-on registration table 22 as the monitoring time. The monitoring time means a personal camp-on setting time. If no personal camp-on communication is established within the setting time, that is, if the communication status of the call-receiving-side subscriber does not turn from a busy state (or reception rejecting state) to a free state within the monitoring time, the related camp-on setting is canceled and the personal ID of calling-side subscriber and the personal ID of call-receiving-side subscriber and the terminal number of calling-side subscriber and call-receiving-side subscriber are deleted from the personal camp-on registration table 22.

When receiving, from the camp-on-set calling-side subscriber, his own personal ID and the personal ID of the call-receiving-side subscriber together with a camp-on canceling request, the personal camp-on canceling section 16 accesses the personal camp-on registration table 22 based on the personal ID of the calling-side subscriber, and deletes the personal ID of calling-side subscriber and the personal ID of call-receiving-side subscriber and the terminal number of calling-side subscriber and the terminal number of call-receiving-side subscriber being registered. In this case, where camp-on settings have been made of the above calling-side subscriber and a plurality of call-receiving-side subscribers, that is, where a plurality of call-receiving-side personal IDs are registered in the personal camp-on registration table 22, the personal camp-on canceling section 16 collates those call-receiving-side personal IDs with the above-received call-receiving-side personal ID, and cancels only the registered content corresponding to the matched call-receiving-side personal ID. On the other hand, where only the personal ID of the calling-side subscriber is received, the personal camp-on canceling section 16 cancels all of the plurality of settings.

At the time of each of the personal camp-on setting and canceling, the personal camp-on informing section 18 transmits, to the call-receiving-side subscriber, the personal ID of the calling-side subscriber together with a notice of camp-on setting or cancellation.

Activated periodically, the personal camp-on monitoring section 17 accesses the personal camp-on registration table 22, and reads out the personal IDs and the terminal numbers of the camp-on set calling-side and call-receiving-side subscribers. And, the personal camp-on monitoring section 17 informs the personal status managing section 13 of the calling-side and call-receiving-side personal IDs, and requests it to monitor those subscribers. Then, the personal camp-on monitoring section 17 informs the calling-side and call-receiving-side terminal numbers to the terminal status managing section 12, and requests it to monitor the those terminals. When receiving information indicating free states corresponding to both personal IDs from the personal status managing section 13 and information indicating free states corresponding to both terminal numbers from the terminal status managing section 12, the personal camp-on monitoring section informs the personal-camp-on executing section 14 of the personal camp-on registration number of this personal camp-on operation.

When receiving the personal camp-on registration number from the personal camp-on monitoring section 17, the personal camp-on executing section 14 accesses the personal camp-on registration table 22 based on the received personal camp-on registration number, and calls the call-receiving-side subscriber first by reading out the content of this personal camp-on setting, i.e., the personal IDs and the terminal numbers of the calling-side subscriber and the call-receiving-side subscriber. If the call-receiving-side subscriber responds to the call, the personal camp-on executing section 14 calls the calling-side subscriber. If the calling-side subscriber also responds, the personal camp-on executing section 14 establishes a call between the communication terminals of those subscribers.

Figure 8:
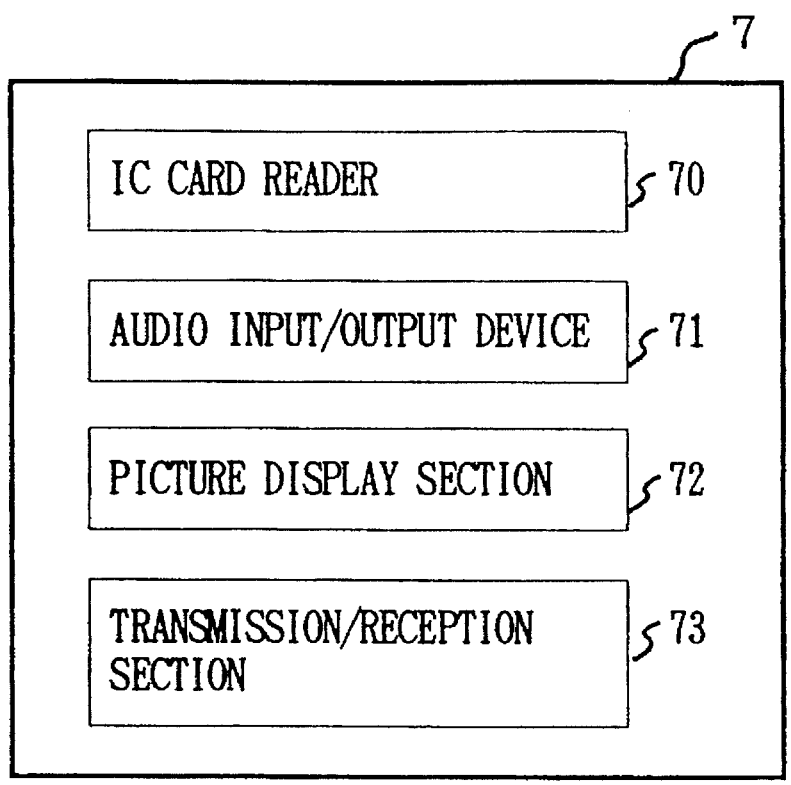
FIG. 8 is a functional block diagram showing a configuration of a communication terminal in the second embodiment.

FIG. 8 is a block diagram showing a configuration of the communication terminal 7 in terms of its functional units. Although FIG. 8 shows only the communication terminal 7, the communication terminal 8 has a similar configuration.

The communication terminal 7 has an IC card reader 70, an audio input/output device 71, a picture display section 72 and a transmission/reception section 73.

As soon as a subscriber sets an IC card, the IC card reader 70 reads out a personal ID from the IC card, and informs the transmission/reception section 63 of the personal ID. In response, the transmission/reception section 73 transmits the received personal ID to the camp-on communication managing server 10 through the exchange 9.

The audio input/output device 71 informs a camp-on setting notice and a camp-on cancelling notice in voice.

The picture display section 72 displays a camp-on setting notice and a camp-on canceling notice on a screen.

In the following, the operation of the camp-on communication managing server 10 will be described.

When the communication controller (CC) receives a position changing order of a subscriber from his communication terminal 7 or 8, that is, when a subscriber moves to change communication terminals, he sets an IC card in the new communication terminal 7 or 8, and the new communication terminal 7 or 8 transmits a personal ID stored in the IC card to the camp-on communication managing server 10, the communication controller (CC) 10a activates the personal position managing section 11 and updates the position of the subscriber. More specifically, the personal position managing section 11 determines the terminal number of the new communication terminal 7 or 8. Then the personal position managing section 11 accesses the personal position registration table 21, and updates the terminal number that is stored with the personal ID to the terminal number of the new communication terminal 7 or 8.

In the above operation, the personal position managing section 11 judges whether the personal ID concerned belongs to a certain camp-on setting by referring to the camp-on registration flag.

Figure 9:
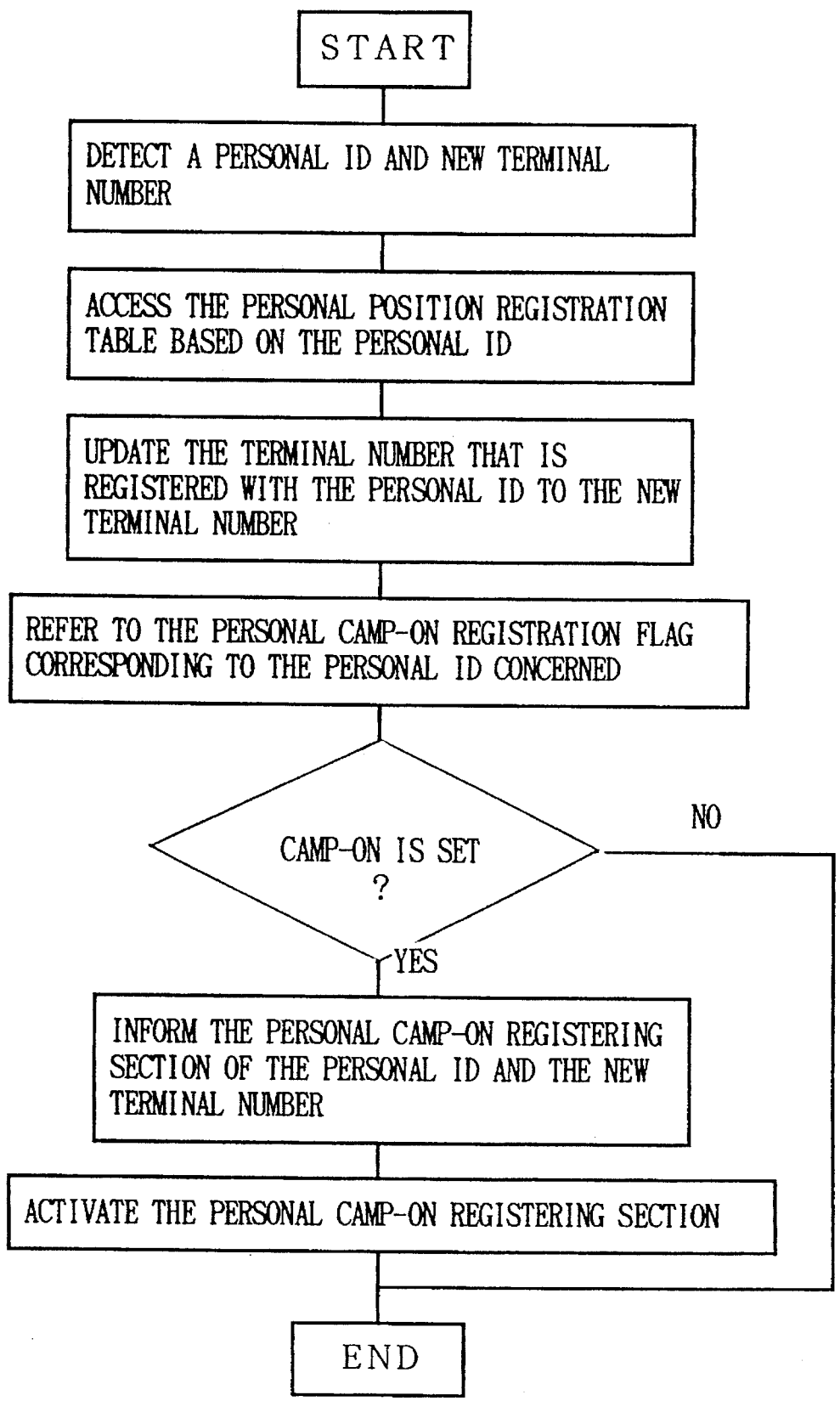
FIG. 9 is a flowchart showing an operation of a personal position managing section.

If the judgment is affirmative, the personal position managing section 11 informs the personal camp-on registering section 15 of the personal ID concerned and the terminal number of the new communication terminal (see FIG. 9).

Figure 10:
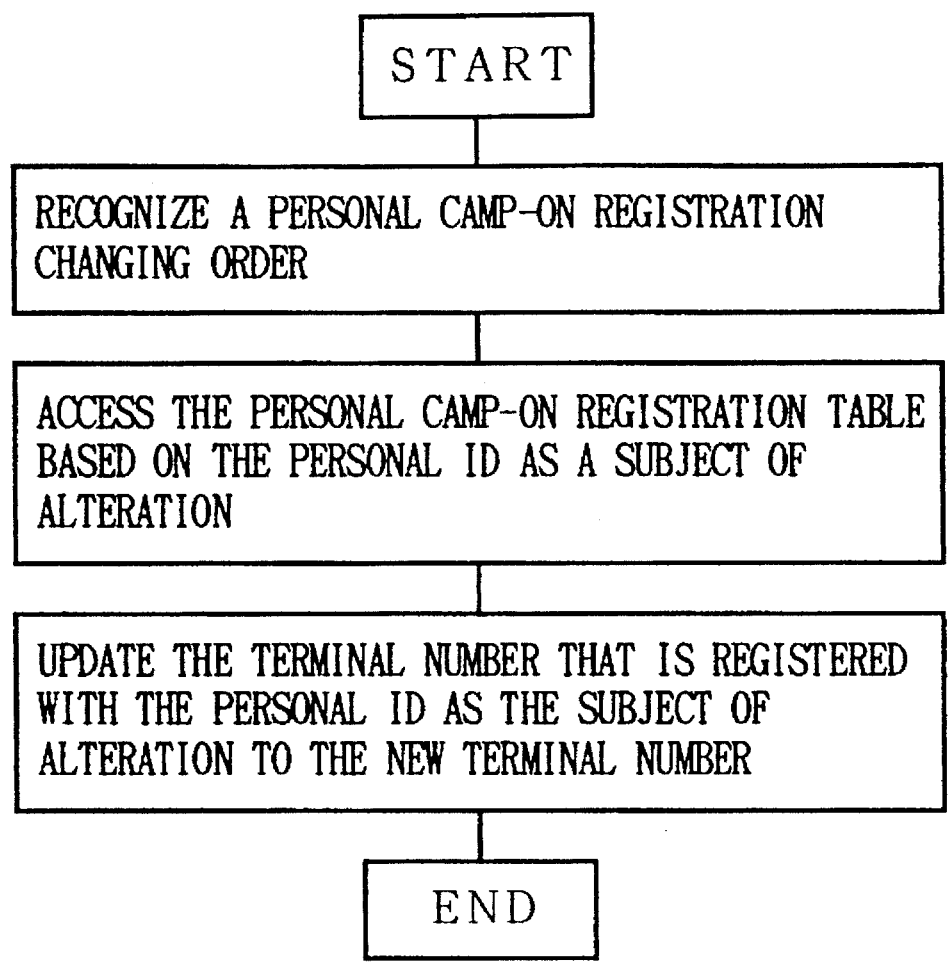
FIG. 10 is a flowchart showing an operation of a personal camp-on registering section.

When receiving the personal ID and the terminal number of the new communication terminal from the personal position managing section 11, the personal camp-on registering section 15 accesses the personal camp-on registering table 22 based on the received personal ID, and updates the terminal number that is registered with the received personal ID to the terminal number of the new communication terminal. Further, the personal camp-on registering section 15 informs the personal camp-on monitoring section 17 of the change of the communication terminal to be monitored (see FIG. 10).

As another operation, when receiving a camp-on setting request from a calling-side subscriber who has found that a call-receiving-side subscriber is busy or in a reception rejecting state, the communication controller (CC) 10a activates the personal camp-on registering section 15.

Figure 11:
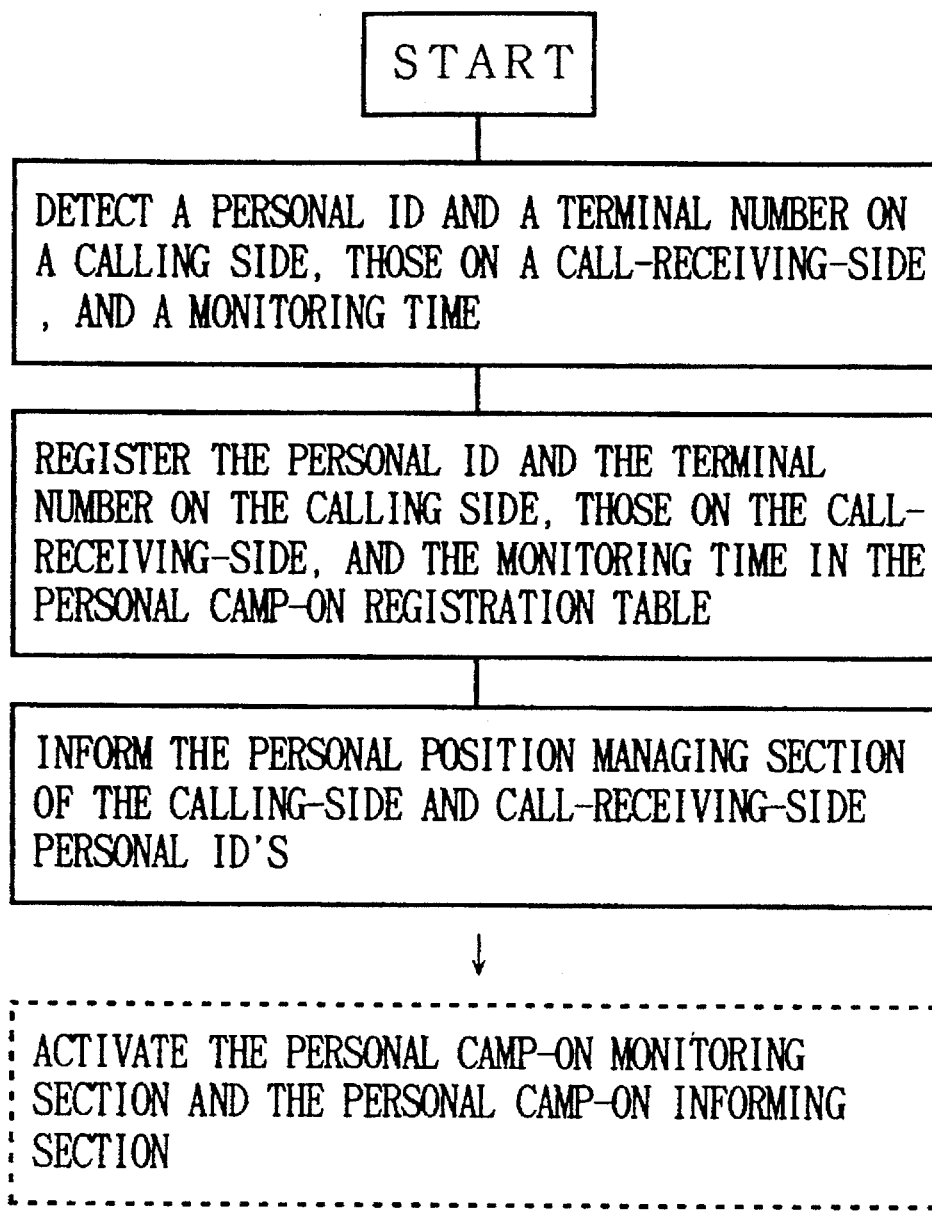
FIG. 11 is a flowchart showing another operation of the personal camp-on registering section.

In response, the personal camp-on registering section 15 determines the personal ID of the calling-side subscriber and the terminal number of a communication terminal accompanied by the calling-side subscriber and the personal ID of the call-receiving-side subscriber and the terminal number of a communication terminal accompanied by the call-receiving-side subscriber. The personal camp-on registering section 15 registers the above personal ID and terminal number on the calling side and those on the call-receiving side in the personal camp-on registration table 22 and, at the same time, informs the personal position managing section 11 of the calling-side and call-receiving-side personal IDs (see FIG. 11). Where a monitoring time is also transmitted from the calling-side subscriber, the personal camp-on registering section 15 registers the monitoring time in the personal camp-on registration table 22.

When receiving the calling-side and call-receiving-side personal IDs from the personal camp-on registering section 15, the personal position managing section 11 searches the personal position registration table 21, and updates the personal camp-on registration flag of the calling-side personal ID to a flag indicating registration and also updates the camp-on registration flag of the call-receiving-side personal ID to a flag indicating registration. Further, the communication controller (CC) 10a recognizes the completion of the personal camp-on setting, and activates the personal camp-on informing section 18 and the personal camp-on monitoring section 17.

Receiving the calling-side and call-receiving-side personal IDs from the personal camp-on registering section 15, the personal camp-on informing section 18 informs the call-receiving-side subscriber of the calling-side personal ID and the setting of personal camp-on based on the personal ID and the terminal number on the call-receiving side. As a result, in the communication terminal 7 accompanied by the call-receiving-side subscriber, the picture display section 72 displays, on the screen, the calling-side personal ID and a message indicating the setting of personal camp On the other hand, the communication controller (CC) 10a activates the personal camp-on monitoring section 17 at predetermined intervals. The personal camp-on monitoring section 17 reads out the personal ID of the camp-on-set calling-side subscriber from the personal camp-on registration table 22, and informs the personal status managing section 13 of the thus-read personal ID. The personal status managing section 13 judges based on the above personal ID whether the calling-side subscriber is free. If the judgment is affirmative, the personal status managing section 13 informs the personal camp-on monitoring section 17 of this fact.

The personal camp-on monitoring section 17 reads out the terminal number of the calling-side communication terminal from the personal camp-on registration table 22, and informs the terminal status managing section 12 of the terminal number.

In response, the terminal status managing section 12 judges based on the received terminal number whether the calling-side communication terminal is free. If the judgment is affirmative, the terminal status managing section 12 informs the personal camp-on monitoring section 17 of this fact.

The personal camp-on monitoring section 17 reads out the call-receiving-side personal ID from the personal camp-on registration section 22, and informs the personal status managing section 13 of the thus-read personal ID. The personal status managing section 13 judges whether the call-receiving-side subscriber is free. If the judgment is affirmative, the personal status managing section 13 informs the personal camp-on monitoring section 17 of this fact.

The personal camp-on monitoring section 17 reads out the terminal number of the call-receiving-side communication terminal from the personal camp-on registration table 22, and informs the terminal status managing section 12 of the terminal number. In response, the terminal status managing section 12 judges whether the call-receiving-side communication terminal is free. If the judgment is affirmative, the terminal status managing section 12 informs the personal camp-on monitoring section 17 of this fact.

At this time, if all of the calling-side subscriber and communication terminal and the call-receiving-side subscriber and communication terminal are free, the personal camp-on monitoring section 17 informs the personal camp-on executing section 14 of the personal camp-on registration number of the camp-on setting concerned.

On the other hand, if at least one of the calling-side subscriber and communication terminal and the call-receiving-side subscriber and communication terminal is not free, the personal camp-on monitoring section 17 repeats the above procedure. Where the monitoring time is set, the personal camp-on monitoring section 17 judges whether an elapsed time from the time point of the registration to the present time is within the monitoring time. If the judgment is affirmative, the personal camp-on monitoring section 17 repeats the above procedure. If the elapsed time exceeds the elapsed time, the personal camp-on monitoring section 17 informs the personal-camp-on canceling section 16 of the personal camp-on registration number of the camp-on setting concerned (see FIG. 12).

When receiving an execution request and the registration number of the personal camp-on communication to be executed, the personal camp-on executing section 14 accesses the personal camp-on registration table 22.

Then, the personal camp-on executing section 14 reads out, from the personal camp-on registration table 22, the setting content corresponding to the above personal camp-on registration number, i.e., the calling-side personal ID and terminal number and the call-receiving-side personal ID and terminal number.

First, the personal camp-on executing section 14 calls the communication terminal 7 or 8 accompanied by the calling-side subscriber based on the calling-side terminal number. If the calling-side subscriber respond, then the personal camp-on executing section 14 calls the communication terminal 7 or 8 accompanied by the call-receiving-side subscriber based on the call-receiving-side terminal number. If the call-receiving-side subscriber respond, the personal camp-on executing section 14 establishes a call between the calling and call-receiving-side subscribers, and requests the personal camp-on canceling section 16 to cancel the personal camp-on setting concerned. (See FIG. 13)

Next, the operation of the personal camp-on canceling section 16.

When receiving a setting cancellation request from the personal camp-on monitoring section 17, the personal camp-on executing section 14 or the calling-side subscriber, the communication controller (CC) 10a informs the personal camp-on canceling section 16 of the. Calling-side personal ID and the call-receiving-side personal ID belonging to the setting to be canceled.

The personal camp-on canceling section 16 accesses the personal camp-on registration table 22 based on the calling-side personal ID and the call-receiving-side personal ID, and deletes the calling-side personal ID and terminal number, the call-receiving-side personal ID and terminal number, and the monitoring time. Further, the personal camp-on canceling section 16 informs the personal position managing section 11 of the calling-side personal ID and the call-receiving-side personal ID to be deleted.

In response, the personal position managing section 11 searches the personal position registration table 21 based on the calling-side personal ID, and updates the personal camp-on registration flag that is registered with the calling-side personal ID to a flag indicating camp-on non-registration, or decrements the flag value by 1. Then, the personal position managing section 11 searches the personal position registration table 21 based on the call-receiving-side personal ID, and updates the personal camp-on registration flag that is registered with the call-receiving-side personal ID to a flag indicating camp-on non-registration, or decrements the flag value by 1. Incidentally, when receiving a personal camp-on cancellation request from the calling-side subscriber, the personal camp-on canceling section 16 informs the personal camp-on informing section 18 of the calling-side personal ID and the call-receiving-side personal ID.

The personal camp-on informing section 18 informs the call-receiving-side subscriber of the calling side personal ID and cancellation of the personal camp-on setting based on the call-receiving-side personal ID and terminal number. In response, the communication terminal 7 accompanied by the call-receiving-side subscriber displays, on the screen, the calling-side personal ID and a message indicating cancellation of the personal camp-on setting, and outputs, in voice, the calling-side personal ID and a message indicating cancellation of the personal camp-on setting.

According to the second embodiment, a camp-on communication can be established even where the communication terminal of actual use is changed by a subscriber by his movement, transfer, etc. Further, by informing a call-receiving-side subscriber of camp-on setting or cancellation, the call-receiving-side subscriber can change his communication terminal of actual use being aware of the camp-on setting.

What is claimed is:

1. A camp-on communication managing method comprising:

a personal position managing step of searching, when personal identification information for identifying a calling-side subscriber and personal identification information for identifying a call-receiving-side subscriber are received from the calling-side subscriber, for information in a personal position registration table in which terminal identification information for identifying communication terminals used by respective subscribers are registered, and detecting from said table terminal identification information of a communication terminal used by the calling-side subscriber and terminal identification information of a communication terminal used by the calling-side subscriber;

a personal camp-on managing step of registering the personal identification information of the calling-side subscriber, the calling-side terminal identification information, the personal identification information of the call-receiving-side subscriber, and call-receiving-side terminal identification information in a personal camp-on registration table in which a subscriber who requests a camp-on operation is to be registered;

a personal status managing step of monitoring a communication status of each subscriber, and updating a content of a personal status registration table in which information for identifying the communication status of each subscriber is registered when there occurs a status transition from a communication-possible state to a communication-impossible state or vice versa;

a detecting step of detecting that the call-receiving-side subscriber has made a status transition to a communication-possible state by referring to the personal status registration table; and a calling step of referring to the personal camp-on registration table based on the personal identification information of the call-receiving-side subscriber, reading out the terminal identification information of the call-receiving-side subscriber and the terminal identification information of the calling-side-subscriber, and calling the calling-side-subscriber and the call-receiving-side subscriber based on the terminal identification information of the call-receiving-side subscriber and of the calling-side subscriber.

2. The camp-on communication managing method according to claim 1, wherein the personal camp-on managing step comprises the sub-steps of:

informing the call-receiving-side subscriber of camp-on setting when the calling-side personal identification information and terminal identification information and the call-receiving-side personal identification information and terminal identification information are registered in the personal camp-on registration table.

3. The camp-on communication managing method according to claim 1, wherein the personal position managing step comprises the sub-steps of:

receiving, when an arbitrary subscriber has changed the communication terminal of use to another communication terminal, personal identification information of the subscriber from said another communication terminal;

determining terminal identification information of said another communication terminal; and searching in the personal position registration table for information based on the personal identification information, and rewriting terminal identification information of the subscriber to said determined terminal identification information.

4. The camp-on communication managing method according to claim 2, wherein when the personal position registration table has been updated, the personal camp-on managing step comprises the sub-steps of:

searching in the personal camp-on registration table for information based on the personal identification information to determine whether the subscriber is camp-on-registered; and rewriting, if the subscriber is camp-on-registered, terminal identification information of the subscriber to said determined terminal identification information.

5. The camp-on communication managing method according to claim 1, wherein the personal status managing step comprises the sub-steps of:

monitoring a communication status of a communication terminal of each subscriber;

detecting, when detecting a communication terminal which has made a status change from a communication-impossible state to a communication-possible state or vice versa, terminal identification of said communication terminal; and searching in the personal status registration table for information based on the terminal identification information, and rewriting status identification information of the communication terminal.

6. The camp-on communication managing method according to claim 5, wherein said calling step comprises the sub-steps of:

referring to the personal status registration table, and monitoring the communication status of the call-receiving-side subscriber registered in the personal camp-on registration table;

when the call-receiving-side subscriber has made a status change to a communication-possible stat, searching in the personal camp-on registration table for information based on the personal identification information, and reading out the calling-side terminal identification information and the call-receiving-side terminal identification information from said personal camp-on registration table; and calling the calling-side subscriber and the call-receiving-side subscriber based on calling-side terminal identification information and the call-receiving-side terminal identification information.

7. The camp-on managing method according to claim 1, wherein the personal camp-on managing step comprises the sub-steps of:

determining, when a camp-on canceling request from the calling-side subscriber is received, the personal identification information of the calling-side subscriber; and searching in the personal camp-on registration table for information based on the personal identification information, and deleting the personal identification information of the calling-side subscriber, the calling-side terminal identification information, the personal identification information of the call-receiving-side subscriber and the call-receiving-side terminal identification information from the personal camp-on registration table.

8. The camp-on communication managing method according to claim 7, wherein the personal camp-on managing step comprises the sub-steps of:

determining, when the camp-on canceling request is received from the calling-side subscriber, the personal identification information of the calling-side subscriber;

searching in the personal camp-on registration table for information based on the personal identification information, and deleting the personal identification information of the calling-side subscriber, the calling-side terminal identification information, the personal identification information of the call-receiving-side subscriber and the call-receiving-side terminal identification information from the personal camp-on registration table; and informing the call-receiving-side subscriber of camp-on cancellation.

9. The camp-on communication managing method according to claim 1, wherein the personal camp-on managing step comprises the sub-steps of:

measuring an elapsed time from when the personal identification information of the calling-side subscriber, the calling-side terminal identification information, the personal identification information of the call-receiving-side subscriber and the call-receiving-side subscriber are registered in the personal camp-on registration table; and deleting the personal identification information of the calling-side subscriber, the calling-side terminal identification information, the personal identification information of the call-receiving-side subscriber and the call-receiving-side subscriber from the personal camp-on registration table if the call-receiving-side subscriber does not make a status transition to a communication-possible state within a specified period.

10. The camp-on communication managing method according to claim 9, wherein the specified period is changed in response to a request from the calling-side subscriber.

11. A camp-on communication managing apparatus comprising:

a personal position registration table in which terminal identification information for identifying a communication terminal used by each subscriber is registered for each personal identification information for identifying a subscriber;

a personal status registration table in which information indicating whether each subscriber is in a communication-possible state is registered for each said personal identification information;

a personal camp-on registration table in which personal identification information of a calling-side subscriber who requests a camp-on operation and personal identification information of a call-receiving-side subscriber are to be registered;

personal position managing means for referring, when receiving the personal identification information of the calling-side subscriber and the personal identification information of the call-receiving-side subscriber from the calling-side subscriber, to the personal position registration table based on the calling-side personal identification information and the call-receiving-side personal identification information, and for detecting calling-side terminal identification information and call-receiving-side terminal identification information;

personal camp-on managing means for registering the calling-side personal identification information and terminal identification information and the call-receiving-side personal identification information and terminal identification information in the personal camp-on registration table;

personal status managing means for monitoring a communication status of the call-receiving-side subscriber, and for rewriting communication status identification information of the personal status registration table when the communication state of the call-receiving-side subscriber has been made a status transition; and calling means for searching, when detecting that the call-receiving-side subscriber has made a status transition to a communication-possible state by referring to the personal status registration table, for information in the personal camp-on registration table based on the personal identification information of the call-receiving-side subscriber, reading out the terminal identification information of the call-receiving-side subscriber and the terminal identification information of the calling-side subscriber from the personal camp-on registration table, and calling the calling-side subscriber and the call-receiving-side subscriber based on the terminal identification information of the call-receiving-side subscriber and the calling-side subscriber.

12. The camp-on communication managing apparatus according to claim 11, wherein the personal camp-on managing means informs the call-receiving-side subscriber of camp-on setting when the personal identification information of the calling-side subscriber and the calling-side terminal identification information and the personal identification information of the call-receiving-side subscriber and the call-receiving-side terminal identification information are registered in the personal camp-on registration table.

13. The camp-on communication managing apparatus according to claim 11, wherein when an arbitrary subscriber has changed the communication terminal of use to another communication terminal and the personal position managing means receives personal identification information of the subscriber from another communication terminal, the personal position managing means searches for information in the personal position registration table based on the personal identification information, and rewrites terminal identification information of the subscriber to terminal identification information of said another communication terminal.

14. The camp-on communication managing apparatus according to claim 13, wherein when the personal position registration table has been updated, the personal camp-on managing means searches in the personal camp-on registration table for information based on the personal identification information to determine whether the subscriber is camp-on-registered; and if the subscriber is camp-on-registered, rewrites terminal identification information of the subscriber to the terminal identification information of said another communication terminal.

15. The camp-on communication managing apparatus according to claim 11, wherein the personal status managing means monitors a communication status of a communication terminal of each subscriber; and when detecting a communication terminal which has made a status change from a communication-impossible state to a communication-possible state or vice versa, detects terminal identification of said communication terminal which made a status change; and searches in the personal status registration table for information based on the terminal identification information, and rewrites status identification information of the communication terminal.

16. The camp-on communication managing apparatus according to claim 15, wherein said calling means refers to the personal status registration table, and monitors the communication status of the call-receiving-side subscriber registered in the personal camp-on registration table; and when the call-receiving-side subscriber has made a status change to a communication-possible state and, searches in the personal camp-on registration table for information based on the personal identification information, reads out from said personal camp-on registration table the calling-side terminal identification information and the call-receiving-side terminal identification information, and calls the calling-side subscriber and the call-receiving-side subscriber based on the calling-side and the call-receiving side terminal identification information.

17. The camp-on managing apparatus according to claim 11, wherein when receiving a camp-on canceling request from the calling-side subscriber, the personal camp-on managing means determines the personal identification information of the calling-side subscriber; and searches in the personal camp-on registration table for information based on the personal identification information, and deletes the personal identification information of the calling-side subscriber, the calling-side terminal identification information, the personal identification information of the call-receiving-side subscriber and the call-receiving-side terminal identification information from the personal camp-on registration table.

18. The camp-on communication managing apparatus according to claim 16, wherein when receiving the camp-on canceling request from the calling-side subscriber, the personal camp-on managing means determines the personal identification information of the calling-side subscriber;

searches in the personal camp-on registration table for information based on the personal identification information, and deletes the personal identification information of the calling-side subscriber, the calling-side terminal identification information, the personal identification information of the call-receiving-side subscriber and the call-receiving-side terminal identification information from the personal camp-on registration table; and informs the call-receiving-side subscriber of camp-on cancellation.

19. The camp-on communication managing apparatus according to claim 11, wherein the personal camp-on managing means measures an elapsed time from when the personal identification information of the calling-side subscriber, the calling-side terminal identification information, the personal identification information of the call-receiving-side subscriber and the call-receiving-side terminal identification information are registered in the personal camp-on registration table; and deletes the personal identification information of the calling-side subscriber, the calling-side terminal identification information, the personal identification information of the call-receiving-side subscriber and the call-receiving-side terminal identification information from the personal camp-on registration table if the call-receiving-side subscriber does not make a status transition to a communication-possible state within a specified period.

20. The camp-on communication managing apparatus according to claim 19 wherein the personal camp-on managing means changes the specified period in response to a request from the calling-side subscriber.

21. An exchange for executing communication between subscribers according to personal identification information identifying each subscriber, the exchange comprising:

receiving means for receiving a camp-on operation request from a calling subscriber when a called subscriber is in a communication-impossible state;

camp-on setting means for setting camp-on operation between said calling subscriber and said called subscriber; and calling means for calling a communication terminal registered in a personal position registration table by said calling subscriber and a communication terminal registered in said personal position registration table by said called subscriber, when a communication state of said called subscriber changes to a communication-possible state and a communication state of said calling subscriber is a communication-possible state.

22. The exchange according to claim 21, further comprising informing means for informing said communication terminal of said called subscriber of camp-on setting between said calling subscriber and said called subscriber, when said camp-on setting means sets a camp-on operation.

23. The exchange according to claim 21, further comprising personal status managing means for monitoring a communication state of said called subscriber and determining whether the communication state of said called subscriber has changed from a communication-impossible state to a communication-possible state when said camp-on setting means sets the camp-on operation between said calling subscriber and said called subscriber.

24. An exchange according to claim 21, and further comprising:

a personal position registration means for registering terminal identification information which identified communication terminal used by each subscriber for each personal identification information;

a personal position managing means for rewriting terminal identification information of a subscriber to new terminal identification information when an arbitrary subscriber has changed a communication terminal of use to another communication terminal and said personal position managing means receives personal identification information of the subscriber from said another communication terminal; and a camp-on setting means for determining whether said subscriber is camp-on set, and informing said personal status managing means of the terminal identification information of said another communication terminal if said subscriber has been set to a camp-on operation.

25. The exchange according to claim 21, further comprising camp-on canceling means for canceling the camp-on setting between said called subscriber and said calling subscriber, when receiving the camp-on canceling request from said calling subscriber.

26. The exchange according to claim 25, and further comprising informing means for informing said communication terminal of said called subscriber of canceling of camp-on setting between said calling subscriber and said called subscriber, when said camp-on canceling means cancels camp-on setting.

27. An exchange for executing communication between subscribers according to personal identification information identifying each subscriber, the exchange comprising:

receiving means for receiving a camp-on setting request from a calling subscriber, when a called subscriber is in a communication-impossible state;

camp-on setting means for setting camp-on operation between said calling subscriber and said called subscriber;

measuring means for measuring an elapsed time from when said camp-on setting means sets camp-on operation between said calling subscriber and said called subscriber;

camp-on canceling means for canceling the camp-on setting, if a communication state of said called subscriber is not changed to a communication-possible state within a specified period; and calling means for calling the communication terminal of said calling subscriber and the communication terminal of said called subscriber, if the communication state of said called subscriber is changed to a communication-possible state within a specified period.

28. The exchange according to claim 27, and further comprising:

personal position registration means for registering terminal identification information for identifying a communication terminal used by each subscriber for each personal identification information for identifying each subscriber;

personal status registration means for registering information indicating whether each subscriber is in a communication-possible state or in a communication-impossible state for each said personal identification information; and personal camp-on registration means for registering personal identification information of a calling subscriber who requests a camp-on operation, a terminal identification information for an identified communication terminal which is used by said calling subscriber, personal identification information of the called subscriber, and a terminal identification information for the identified communication terminal which is used by said called subscriber.

29. The exchange according to claim 28, wherein said camp-on setting means monitors said personal status registration means and determines whether a communication state of said called subscriber has changed to a communication-possible state, reads-out the terminal identification information of said calling subscriber and the terminal identification information of said called subscriber from said personal camp-on registration means, when detecting that the communication state of said called subscriber has changed to a communication-possible state by monitoring said personal status registration means, and calls a communication terminal of said calling subscriber and a communication terminal of said called subscriber on the basis of the terminal identification information of the calling subscriber and terminal identification information of the called subscriber, which are read-out from said personal camp-on registration means.

30. An exchange for executing communication between subscribers according to personal identification information identifying each subscriber, the exchange comprising:

receiving means for receiving a camp-on operation request from a calling subscriber when a called subscriber is in a first communication state;

camp-on setting means for setting camp-on operation between said calling subscriber and said called subscriber; and calling means for calling a communication terminal registered in a personal position registration table used by said calling subscriber and a communication terminal registered in said personal position registration table used by said called subscriber, when a communication state of said called subscriber is changed to a second communication state and said calling subscriber is in a second communication state.

31. An exchange for executing communication between subscribers according to personal identification information identifying each subscriber, the exchange comprising:

receiving means for receiving a camp-on setting request from a calling subscriber, when a called subscriber is in a first communication state;

camp-on setting means for setting camp-on operation between said calling subscriber and said called subscriber;

measuring means for measuring a time from when said camp-on setting means sets camp-on operation between said calling subscriber and said called subscriber;

camp-on cancelling means for cancelling camp-on setting, if said called subscriber is in a first communication state within a specified period; and calling means for calling a communication terminal used by said calling subscriber and a communication terminal used by said called subscriber, if the communication state of said called subscriber is changed to a second communication state within a specified period.

32. An exchange for executing communication between subscribers according to personal identification information identifying each subscriber, the exchange comprising:

receiving means for receiving a service request from a calling subscriber when a called subscriber is in a first communication state;

disconnecting means for disconnecting a call from said calling subscriber to said called subscriber when said receiving means received the service request;

service setting means for setting a service between said calling subscriber and said called subscriber; and calling means for calling a communication terminal registered in a personal position registration table used by said calling subscriber and a communication terminal registered in said personal position registration table used by said called subscriber, when a communication state of said called subscriber is changed to a second communication state and said calling subscriber is in a second communication state.

33. An exchange for executing communication between subscribers according to personal identification information identifying each subscriber, the exchange comprising:

receiving means for receiving a service request from a calling subscriber, when a called subscriber is in a first communication state;

disconnecting means for disconnecting a call from said calling subscriber to said called subscriber when said receiving means received the service request;

service setting means for setting a service between said calling subscriber and said called subscriber;

measuring means for measuring a time from when said service setting means sets the service between said calling subscriber and said called subscriber;

service cancelling means for cancelling the service, if said called subscriber is in a first communication state within a specified period; and calling means for calling a communication terminal used by said calling subscriber and a communication terminal used by said called subscriber, if the communication state of said called subscriber is changed to a second communication state within a specified period.

34. A communication terminal connected to an exchange which can be set to a camp-on operation between a calling party and a called party when said called party is in a communication-impossible state, the terminal comprising:

transmission means for transmitting personal identification information identifying a calling party and a called party to said exchange; and camp-on request means for sending a camp-on operation request to said exchange when said called party is in a communication-impossible state.

35. The terminal according to claim 34, further comprising a canceling request means for sending a camp-on canceling request to said exchange, when said exchange is set to the camp-on operation between said calling party and said called party.

36. A communication terminal connected to an exchange which can be set to a camp-on operation between a calling party and a called party when said called party is in a communication-impossible state, the terminal comprising:

receiving means for receiving information that a camp-on operation has been set by a request from the calling party; and informing means for informing the called party of said camp-on operation setting.

37. A communication terminal connected to an exchange which can be set to a camp-on operation between a calling subscriber and a called subscriber when said called subscriber is in a first communication state, the terminal comprising:

transmission means for transmitting personal identification information identifying a calling subscriber and a called subscriber to said exchange; and camp-on request means for sending a camp-on operation request to said exchange when said called subscriber is in a first communication state.

* * * * *